(12) United States Patent
Hamid et al.

(10) Patent No.: US 9,858,479 B2
(45) Date of Patent: ***Jan. 2, 2018

(54) GLOBAL-SCALE DAMAGE DETECTION USING SATELLITE IMAGERY

(71) Applicant: DIGITALGLOBE, INC., Longmont, CO (US)

(72) Inventors: Muhammad Hamid, Seattle, WA (US); Lionel Gueguen, Erie, CO (US)

(73) Assignee: DIGITALGLOBE, INC., Longmont, CO (US)

( * ) Notice: Subject to any disclaimer, the term of this patent is extended or adjusted under 35 U.S.C. 154(b) by 109 days.

This patent is subject to a terminal disclaimer.

(21) Appl. No.: 14/941,504

(22) Filed: Nov. 13, 2015

(65) Prior Publication Data
US 2016/0078273 A1    Mar. 17, 2016

Related U.S. Application Data

(63) Continuation-in-part of application No. 14/810,382, filed on Jul. 27, 2015.
(Continued)

(51) Int. Cl.
| | | |
|---|---|---|
| G06K 9/00 | (2006.01) | |
| G06K 9/46 | (2006.01) | |
| G06K 9/62 | (2006.01) | |
| G06K 9/20 | (2006.01) | |
| G06K 9/48 | (2006.01) | |
| G06K 9/52 | (2006.01) | |

(52) U.S. Cl.
CPC ....... *G06K 9/0063* (2013.01); *G06K 9/00637* (2013.01); *G06K 9/2081* (2013.01); *G06K 9/4671* (2013.01); *G06K 9/4676* (2013.01); *G06K 9/481* (2013.01); *G06K 9/525* (2013.01); *G06K 9/6218* (2013.01); *G06K 9/6269* (2013.01)

(58) Field of Classification Search
CPC ............ G06K 9/00637; G06K 9/4671; G06K 9/0063; G06K 9/2081; G06K 9/4676; G06K 9/481; G06K 9/525; G06K 9/6218; G06K 9/6269
See application file for complete search history.

(56) References Cited

U.S. PATENT DOCUMENTS

| | | | | |
|---|---|---|---|---|
| 2007/0116365 A1* | 5/2007 | Kloer | .................. | G06K 9/6228 382/190 |
| 2012/0143856 A1* | 6/2012 | Klinkigt | ............... | G06K 9/4671 707/723 |
| 2015/0318020 A1* | 11/2015 | Pribula | ............ | H04N 21/43615 386/227 |

OTHER PUBLICATIONS

Jonathan S. Hare; Sina Samangooei; and Paul Lewis, "Efficient Clustering and Quantisation of SIFT features: Exploiting Characteristics of the SIFT descriptor and Interest Region Detectors Under Image Conversion", Apr. 17-20, 2011, ACM 978-1-4503-0336—Jan. 11, 2004.*

(Continued)

*Primary Examiner* — Siamak Harandi
(74) *Attorney, Agent, or Firm* — Galvin Patent Law LLC; Brian R. Galvin

(57) ABSTRACT

A system for performing global-scale damage detection using satellite imagery, comprising a damage detection server that receives and analyzes image data to identify objects within an image via a curated computational method, and a curation interface that enables a user to curate image information for use in object identification, and a method for a curated computational method for performing global scale damage detection.

3 Claims, 10 Drawing Sheets

Related U.S. Application Data

(60) Provisional application No. 62/078,976, filed on Nov. 13, 2014, provisional application No. 62/029,337, filed on Jul. 25, 2014.

(56) References Cited

OTHER PUBLICATIONS

Anne-Lise Chesnel, Renaud Binet; and Lucien Wald, "Object Assessment of Damage Due to Natural Disaster Using Very High Resolution Images", Jul. 2007, IEEE International Geoscience & Remote Sensing Symposium, pp. 3736-3739.*

Gui-Song Xia, Wen Yang, Julie Delan, Yann Gousseau, Hong Sun, Henri Maitre, "Structural High-Resolution Satellite Image Indexing", Mar. 28, 2010, hal-00458685, Version 2.*

* cited by examiner

GLOBAL-SCALE DAMAGE DETECTION USING SATELLITE IMAGERY

CROSS-REFERENCE TO RELATED APPLICATIONS

The present application claims the benefit of, and priority to, U.S. provisional patent application Ser. No. 62/078,976, titled "WORLDWIDE DAMAGE DETECTION SUING SATELLITE IMAGERY" and filed on Nov. 13, 2014, and is a continuation-in-part of U.S. patent application Ser. No. 14/810,382, titled "GLOBAL-SCALE OBJECT DETECTION USING SATELLITE IMAGERY" and filed on Jul. 27, 2015, which claims the benefit of, and priority to, U.S. provisional patent application Ser. No. 62/029,337, titled "GLOBAL-SCALE OBJECT DETECTION USING SATELLITE IMAGERY" and filed on Jul. 25, 2014, the entire specification of each of which is incorporated herein by reference in its entirety.

BACKGROUND OF THE INVENTION

Field of the Art

The disclosure relates to the field of image processing, and more particularly to the field of change detection and specifically damage detection for large-scale satellite image processing systems.

Discussion of the State of the Art

Each year, hundreds catastrophic events impact vulnerable populations around the world. Examples of such events include floods, earthquakes, typhoon, and armed-conflicts, etc. Assessing the nature and extent of damage caused by these crises is crucial in making timely decisions to allocate appropriate resources for helping populations. Since disaster locations are usually not readily accessible, the use of satellite imagery has emerged as a unique and reliable source of information for estimating the impact of catastrophic events. However, currently this assessment is mostly done by analyzing the pre and post-event images of the distressed areas by human photographic interpreters, making it a labor intensive and expensive process.

What is needed is a means to scale up damage detection analysis to larger geographic areas while maintaining high levels of accuracy and efficiency.

SUMMARY OF THE INVENTION

Accordingly, the inventor has conceived and reduced to practice, in a preferred embodiment of the invention, a system and various methods for global-scale damage detection using satellite imagery.

According to a preferred embodiment of the invention, a system for performing global scale damage detection using satellite imagery, comprising a damage detection server comprising at least a plurality of programming instructions stored in a memory and operating on a processor of a network-connected computing device and configured to receive at least a plurality of image information from an image database, and configured to analyze at least a portion of the image information, and configured to produce at least a plurality of object vector representations based at least in part on at least a portion of the analysis results; and a curation interface comprising at least a plurality of programming instructions stored in a memory and operating on a processor of a computing device and configured to receive at least a portion of a plurality of image information, and configured to receive interaction from a human user and to modify at least a portion of the plurality of image information based at least in part on at least a portion of the user interaction, is disclosed.

According to another preferred embodiment of the invention, a method for performing global scale damage detection using satellite imagery, comprising the steps of querying, using a damage detection server comprising at least a plurality of programming instructions stored in a memory and operating on a processor of a network-connected computing device and configured to receive at least a plurality of image information from an image database, and configured to analyze at least a portion of the image information, and configured to produce at least a plurality of damage detection identifiers based at least in part on at least a portion of the analysis results, a database for a plurality of image information; extracting a plurality of scale-invariant transform descriptors based at least in part on at least a portion of the plurality of image information; performing k-means clustering on at least a portion of the plurality of image information; producing a plurality of locally-constrained linear codes based at least in part on at least a portion of the plurality of image information; and performing spatial pooling based at least in part on at least a portion of the plurality of locally-constrained linear codes to produce a plurality of object vector representations, the object vector representations corresponding to at least a plurality of objects identified within at least a portion of the plurality of image information, is disclosed.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
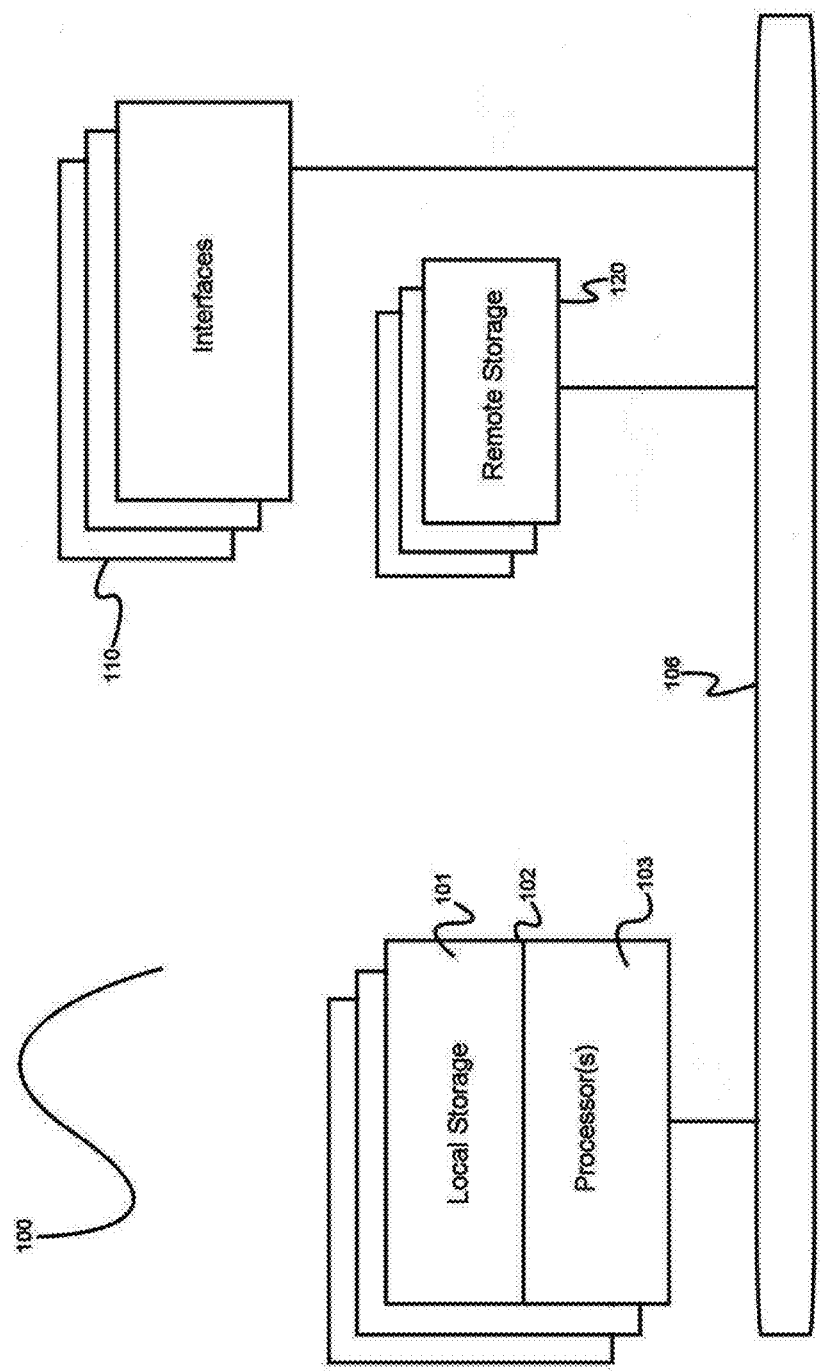
FIG. 1 is a block diagram illustrating an exemplary hardware architecture of a computing device used in an embodiment of the invention.

The inventor has conceived and reduced to practice, in a preferred embodiment of the invention, a system and various methods for global-scale damage detection using satellite imagery.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include non-transitory machine-readable storage media, which, for example, may be configured or designed to store program instructions, state information, and the like for performing various operations described herein. Examples of such non-transitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
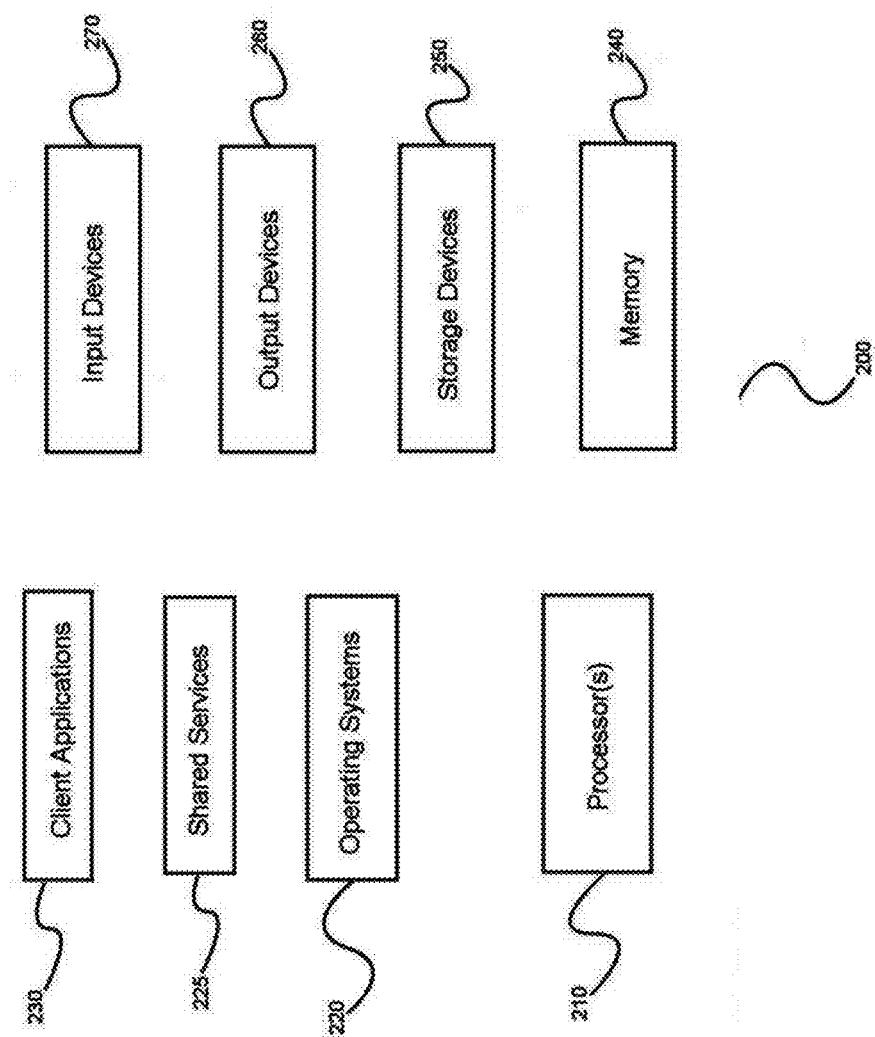
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200, and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
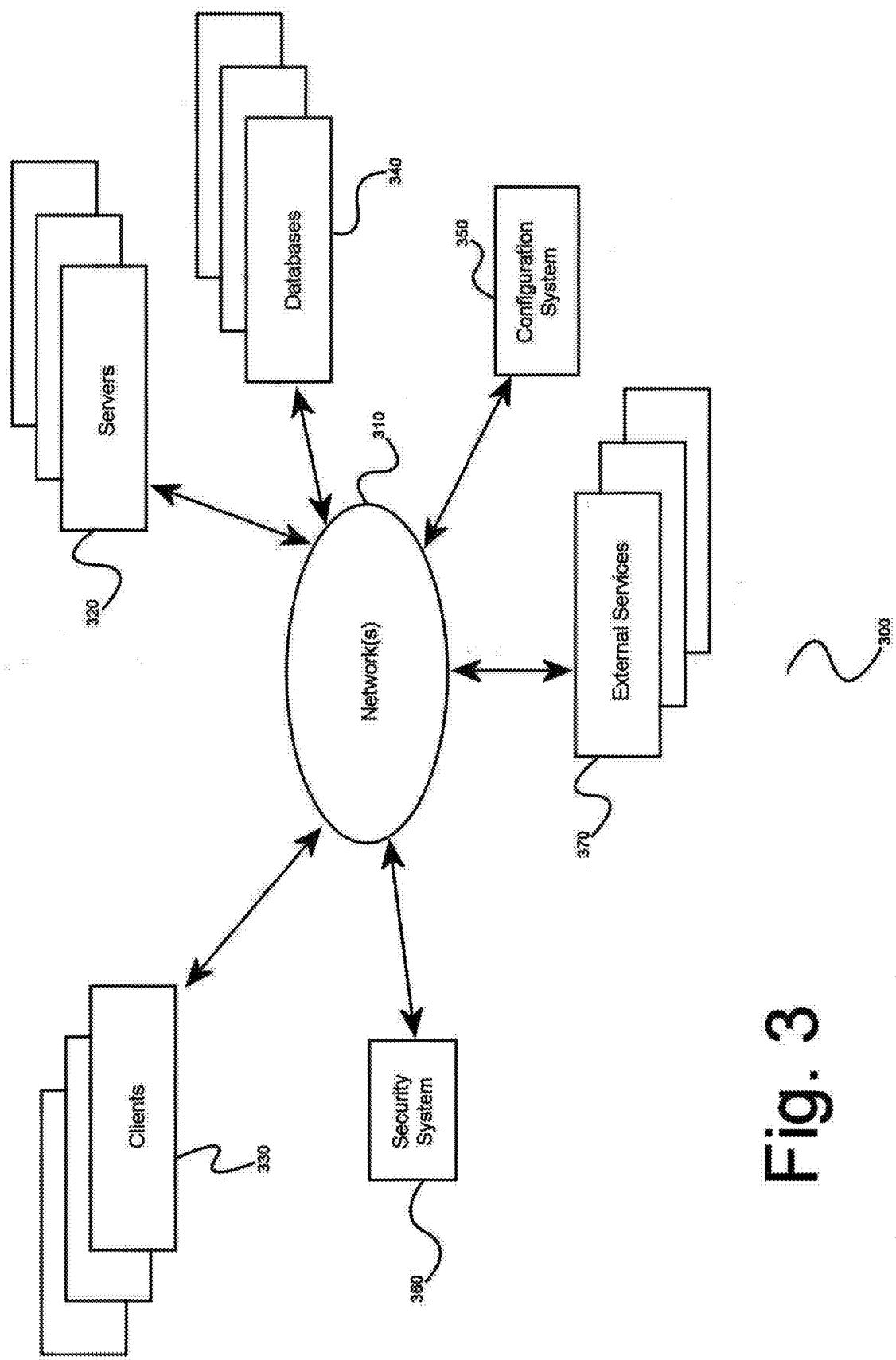
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
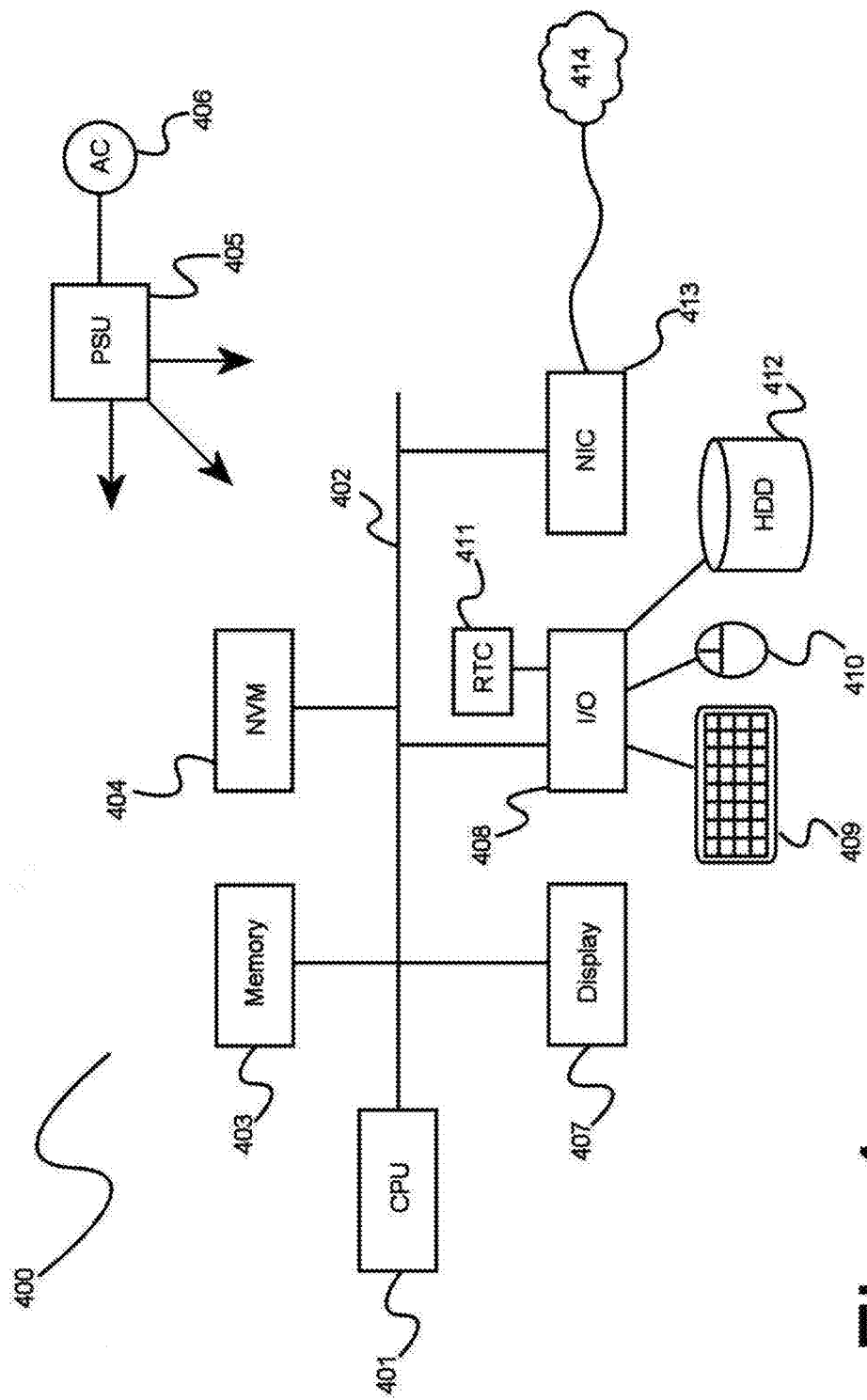
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 10:
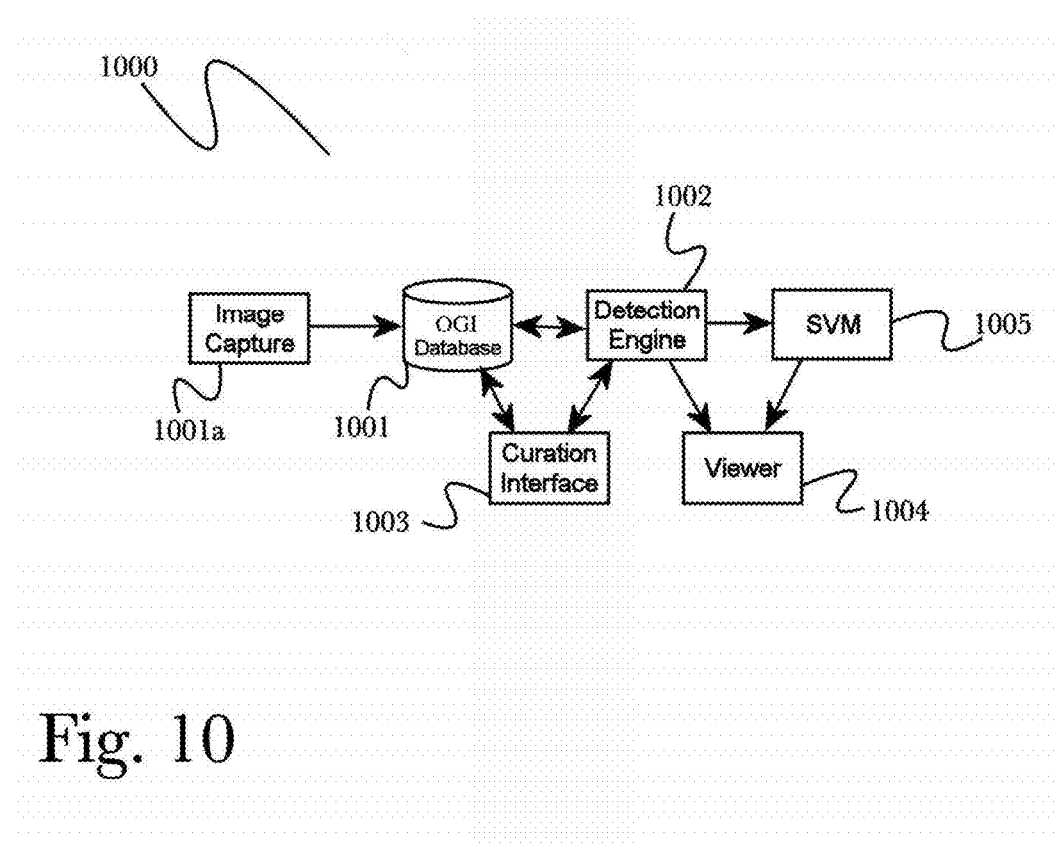
FIG. 10 is a block diagram of an exemplary system architecture for performing global-scale damage detection using satellite imagery, according to a preferred embodiment of the invention.

FIG. 10 is a block diagram of an exemplary system architecture for performing global scale damage detection using satellite imagery, according to a preferred embodiment of the invention. According to the embodiment, an orthorectified geospatial image (OGI) database 1001 may comprise a plurality of stored image information, for example as captured by a plurality of image capture sources 1001*a* such as imaging satellites or other image-capture devices. OGI data may be utilized by a curation interface 1003 for manual curation by a human user, for example via a software-based graphical interface configured to allow a user to manually review or modify image data. According to the embodiment, a software detection engine 1002 may receive and operate on a plurality of OGI data to perform damage detection operations as described in the embodiments and exemplary use cases herein. Image data with damage detection information may then be provided to a software or hardware viewer 1004 for review by a human user (such as on a display monitor for users to visually confirm damage detection results), or to an additional support vector machine 1005 that may perform additional object vector detection prior to presentation to a user via viewer 1004.

Thus far, there has been a lack of comprehensive labeled dataset that could be used to explore automatic damage-detection at scale. To this end, the embodiments disclosed herein describe a thorough benchmark data-set of an exemplary selection of 86 pairs of pre and post-event satellite imagery of distressed areas covering 4,665 $km^2$ with the associated ground-truth of damaged regions acquired by expert photo interpreters. The exemplary dataset covers 12 different regions from around the world, and spans a wide range of terrains, climates, and damage-types. This dataset may be used to rigorously explore and make generalizable conclusions about the various facets of the problem at hand.

The scale of problems within the art naturally presents a trade-off between the accuracy of a considered feature set, and the efficiency with which they can be computed. To find a suitable balance respecting this tradeoff, analysis may consider a large set of features including everything from simple appearance based attributes, to far more involved deep convolutional network outputs. In particular, the embodiments disclosed herein describe the use of shape distributions as an efficient and accurate feature set for the problem of automatic damage detection.

Given the high level of expert skillset generally required from photo-interpreters to assess the damage accurately, acquiring reliable ground-truth labels is particularly challenging. This high label acquisition cost makes it important to explore the various learning paradigms that could utilize labeled data most effectively towards automatic damage detection. To this end, the embodiments disclosed herein present a thorough comparison of different learning strategies, including supervised, unsupervised and semi-supervised methods. Results suggest the use of semi-supervised learning to provide a good tradeoff between the cost of label acquisition and the benefit of detection accuracy.

While it is expected that an automatic system that could detect likely damaged areas would reduce the amount of time human photo-interpreters would spend to curate such detected areas, it has been unclear how much processing speed-up would such a system provide, and at what cost of missed detections would this speed-up come. The embodiments disclosed herein present an exemplary user study of the photo interpretation speed-up provided by the invention, and report more than 10-fold processing time gains for close to no loss in detection accuracy.

Many change detection techniques have been proposed in the literature. A big effort has been placed on unsupervised methods that try to locate outliers that would correspond to changes. Few other methods tried to benefit from the supervised algorithms to provide more accurate decision function and particularly to focus on the relevant changes. Most of the techniques rely on the direct comparison of pixel spectral responses which are highly affected by misalignments and acquisition geometries. A set of other techniques use local image descriptors to be more robust to these variability effects. These studies tend to show that the combination of local descriptors with supervised machine learning lead to the best results, while requiring more computational power and more interactions with photo interpreters.

Figure 5:
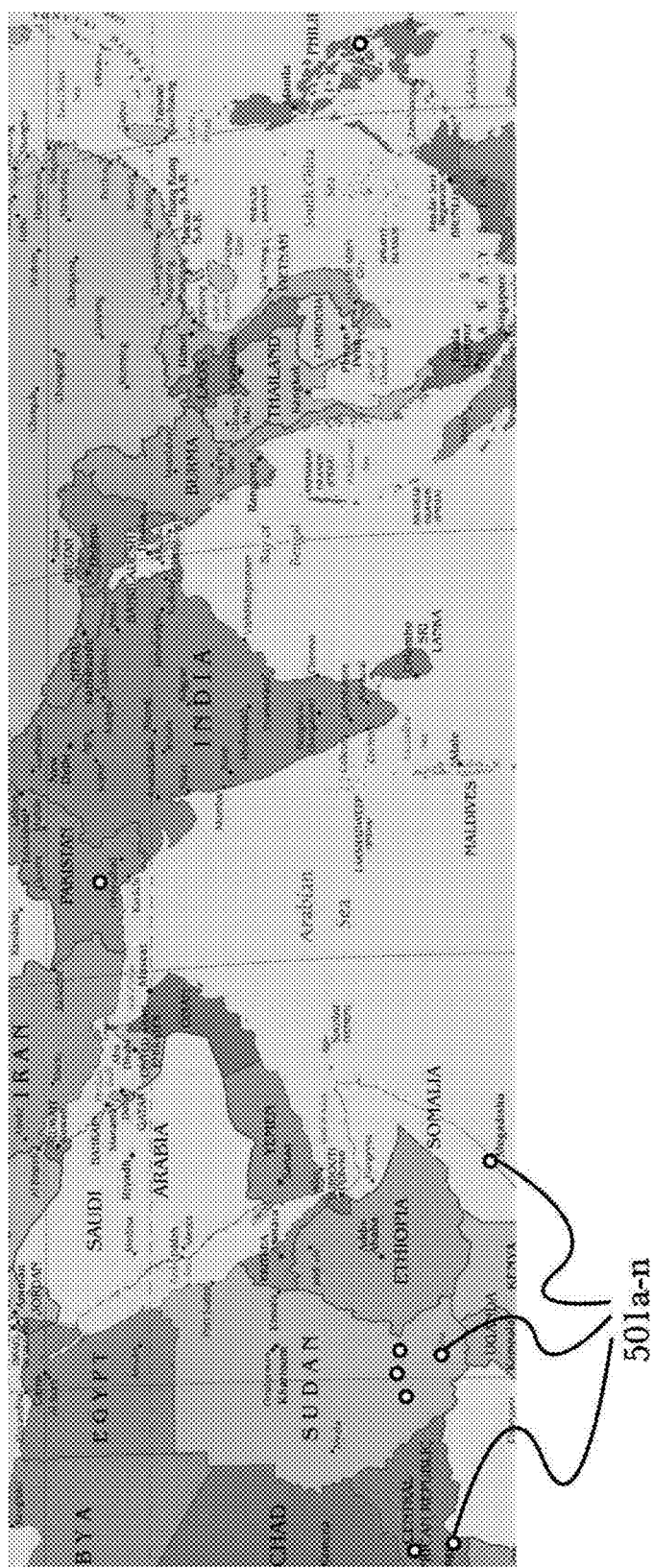
FIG. 5 illustrates an exemplary ground-truth model for twelve areas of interest (AOIs) around the world.

FIG. 5 illustrates an exemplary ground-truth model for twelve areas of interest (AOIs) 501*a-n* around the world from the United Nations Institute for Training and Research (UNITAR/UNOSAT), which is responsible for publishing maps of major armed conflict events, natural disasters and refugee camp developments. These maps provide geolocated points indicating relevant changes on the ground. This ground-truth information may be used to evaluate each of a plurality of considered features and learning methods. Disaster events covered in AOI's may include (for example) include armed conflicts, earthquakes, typhoons, and refugee camp developments, and some exemplary use cases are described below in FIG. 6.

Figure 6:
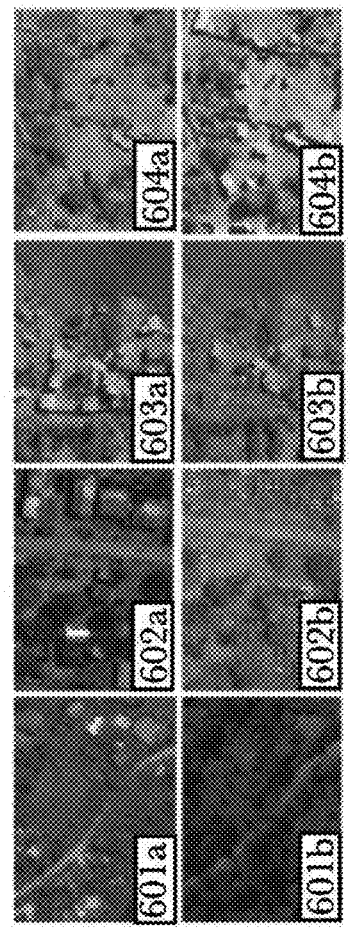
FIG. 6 illustrates a number of exemplary AOI use cases.

FIG. 6 illustrates a number of exemplary AOI use cases. According to the embodiments herein, damage detection may be used to form pre and post-event imagery of an AOI (that is, before and after some form of damage occurred), for example before 601a and after 601b a typhoon (image selected from a typhoon incident in the Philippines, October 2013), a region before 602a and after 602b a period of armed conflict (image selected from a region of the Central African Republic, December 2013), before 603a and after 603b an earthquake (image selected from a region in Pakistan, September 2013), or before 604a and after 604b internal displacement of shelters (image selected from a region in Somalia, May 2013).

In order to obtain high-resolution imagery for the pre and post-events of our AOI's, high-resolution satellite imagery may be utilized. Pairs of remote sensing panchromatic images may be extracted from an image archive, such that they fully cover the boundaries of an AOI.

In the context of damage analysis, pre and post-event images are likely to be captured from different sensors, which can have different ground resolutions. To incorporate such sensor-variability in a dataset a plurality of unique pairs may be selected, resulting in an average number of pairs per AOI. These image-pairs may then be extracted from satellites that may have varying ground sample distance. To simplify matching between sensors, images may be downsampled, for example to a resolution of 1 meter. Exemplary variability in sensor combination for a selection of 86 pairs from exemplary satellites is summarized in Table 1 below.

TABLE 1

Sensor combinations for the 86 image-pairs. QB, WV-1, WV-2 and GE-1 represent the four different sensors QuickBird, WorldView-1, WorldView-2, GeoEye-1 used to acquire imagery.

|      | QB | WV-1 | WV-2 | GE-1 |
|------|----|------|------|------|
| QB   | 1  | —    | —    | —    |
| WV-1 | 9  | 14   | —    | —    |
| WV-2 | 3  | 23   | 6    | —    |
| GE-1 | 5  | 11   | 9    | 5    |

Figure 7:
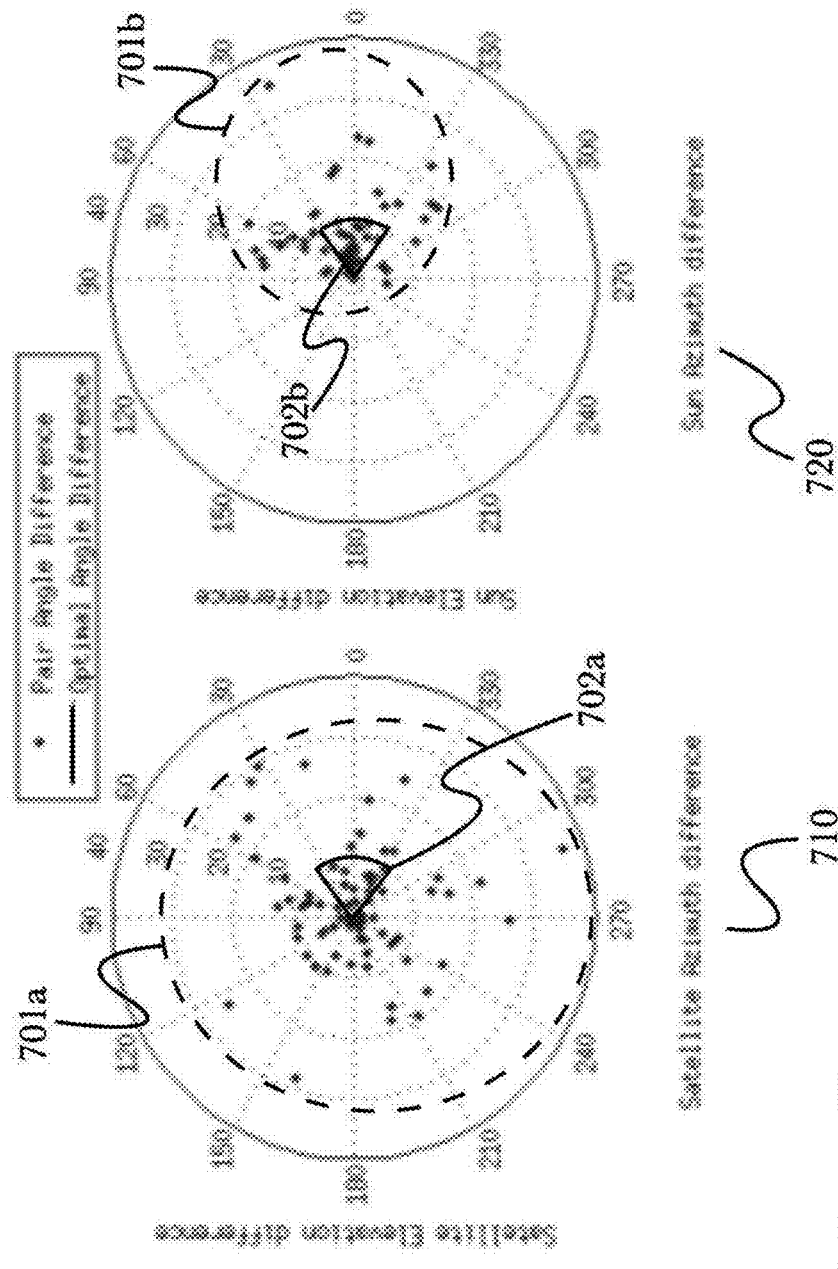
FIG. 7 is an illustration of acquisition angle variability for an exemplary selection of 86 image pairs.

Another important source of variability in remote sensing images is the acquisition angles (sun, satellite elevation and azimuth), as it effects the directions and lengths of the casted shadows. While it would help to have image pairs with similar acquisition angles, given the tight time constraint of damage analysis campaigns images most readily available generally have to be used. These images therefore do not always meet the similar acquisition angles constraint. To incorporate this variability in a dataset, different acquisition angles may be considered for a selection of image pairs. FIG. 7 is an illustration of acquisition angle variability for an exemplary selection of 86 image pairs 701a-n, illustrating the difference in acquisition angle 701a,b for image pairs based on satellite azimuth 710 as well as Sun azimuth 720, and also illustrates a calculated optimal difference 702a,b that may be used to select pairs that will be ideal for use.

The exemplary collected dataset covers a total area of 4665 km$^2$, and contains 9.25 billion 11-bit pixels. Furthermore, the area of significant changes labeled by photo interpreters by the UNITAR/UNOSAT is spread over 174 km$^2$, which corresponds to 3.74% of 12 AOIs. In an exemplary arrangement, using regions of 50×50 m area (equivalent to 50×50-pixel window) sliding over the AOI with a stride of 10×10 m (equivalent to 10×10 pixels) may be used to produce accurate detection results. This level of granularity results in 92 million 50×50 image chips. The size and variability of data according to the embodiments makes it by far the largest dataset used for the problem of large-scale automated catastrophic event analysis.

Image features are extracted in windows of 50×50 m, where windows overlaps with a stride of 10 m. This size has been selected to match the typical scale of changes which are tackled in the assembled dataset. Given a pair of pre and post-windows, a decision can be taken from the stack of their features about the fact that the window contains relevant change or not. The decision or a change index can be replaced at the center of the window, and given a spacing of 10 m between overlapping windows, a heat map of change can be produced at 10 m resolution. The photo interpretation represented as geolocated points is transformed into a raster of 10 m resolution which can be thus compared to the produced change heat maps. Each 10 m pixel is attribute a positive value if a geolocated point falls in the 50×50 m window surrounding it. According to various arrangements, several features may be tested and used: gray scale distribution, bag-of-word of quantized SIFT, bag-of-word of local linear coding of SIFT, shape distributions and convolutional neural network features. According to the embodiments herein, shape distributions and convolutional neural network features are used for the first time in the art for solving change detection problems with satellite images.

Traditionally, optical flow has been use to find the pixel-mappings between pairs of consequent images. Since exemplary pre and post-event images are already aligned, the magnitude of a flow-field may be used as a measure of a change in different parts of an image-pair.

Gray scale distribution (GSD) represents the histogram of gray scale values within an image window. The extraction may be performed for each overlapping window collected from pre and post-images. These features have been extensively used for solving change detection problems and they may be used to constitute baseline features. In an exemplary arrangement, a quantization of 50 bins is used, resulting in a feature vector of 50 dimension for each window.

In an exemplary arrangement, a dense grid of feature-locations over an entire image may be used, and for each location a multidimensional (for example, a 128-dimensional) SIFT image descriptor may be computed. k-means clustering may be used to discover descriptor modes in an extracted feature set, and for each SIFT feature its nearest cluster may be used to encode the feature. Then normalized histograms of feature codes may be computed from each 50×50-pixel image chip. Due to the small chip size, and the potentially non-structural appearance of the changes due to the occurred damage in an area, spatial pooling may (optionally) not be used to encode the spatial arrangements of image-structures more locally.

Due to the hard-assignment applied during feature quantization, the aforementioned bag-of-words model for SIFT descriptors may suffer from high reconstruction error. Therefore, an encoding approach may be used that employs distance based soft-assignment during feature quantization along with locality constrained regularization. These locally-constrained linear codes (LLC) ensure improved feature reconstruction by generating a space that better captures data nonlinearities. For example, the LLC codes may use the following optimization cost-function:

$$\min_{C} \sum_{i=1}^{N} \|x_i - Bc_i\|^2 + \lambda \|d_i \odot c_i\|^2 \quad (1)$$

Where $\odot$ represents element-wise product, $x_i \in R^D$ is the $i^{th}$ feature vector, and $B=[b_1, b_2, \bullet, \bullet, \bullet, b_M] \in R^{D \times M}$ is a basis vector codebook. Moreover, $d_i \in R^M$ is the locality adaptor that varies for each basis vector based on its similarity to $x_i$. More concretely, $$d_i = \exp\left(\frac{dist(x_i, B)}{\sigma}\right) \quad (2)$$

Where $dist(x_i, B)$ and $dist(x_i, b_j)$ is the Euclidean distance between $x_i$ and $b_j$. Furthermore, here σ adjusts the weight decay rate for the locality adaptor. Histograms of these LLC codes may be used to represent each of the 50×50-pixel window, and just as for SIFT features, may not employ any further spatial-pooling.

Shape distributions (SD) have been proposed in several studies for detecting and characterizing objects from satellite imagery. An exemplary approach decomposes an image into shapes, which are then clustered in visual words to allow the "bag of visual words" description. In an exemplary arrangement, a tree-of-shapes may be adopted which effectively organizes the upper and lower-level set-connected components of an image. This representation is especially suited for the analysis of satellite images because many of the man-made structures and objects on the ground can be associated to few connected components of the level sets. The tree-of-shapes is a non-redundant and self-dual representation of the image upper and lower level set connect components. The upper level set may be formally defined for any grayscale image u: Ω→N by:

$$\chi_\lambda(u) = \{p \in \Omega | u(p) \geq \lambda\}. \quad (3)$$

This description is a decomposition of the image, since it allows a perfect reconstruction of the image:

$$u(p) = \sup\{\lambda \in \mathbb{N} \ | p \in \chi_\lambda(u)\}. \quad (4)$$

Additionally, the connected components of the level sets $\{\chi\lambda(u)|\lambda \in N\}$ may be used to fully describe the image u while providing a segment based representation of its content. A connected component at level λ containing a pixel p is referred to as a peak component and is defined by:

$$P_p^\lambda(u) = \Gamma_p(\chi_\lambda(u)), \quad (5)$$

Where $\Gamma_p$ is a connected opening seeded by the pixel p. The lower level set $\Phi_\lambda$ is defined similarly, by inverting the inequality. The upper and lower-level sets can be efficiently encoded in the non-redundant structures MaxTree and MinTree, respectively. By construction, the components of the lower level set correspond to the holes of the components of the upper-level set, and vice-versa. A "tree-of-shapes" structure may be used to fuse both sets in one non-redundant tree where the components are hierarchically nested and the lower and upper components are connected depending on the holes they fill. This representation allows also a perfect reconstruction of the image. Such a tree-of-shapes implementation follows a quasi-linear algorithm, which makes it a fast extraction.

Then, the shapes can be individually characterized by shape, contrast and spectral response descriptors. The contrast is computed as the difference between the grey levels of a component and its parent, such that positive and negative values correspond to upper and lower-level set shapes, respectively. The shape descriptors are derived from second and third-order central moments. For example, if $\{p_i\}_{i=1}^n$ is the n pixels composing a peak component $P_\lambda^p(u)$. Each 1 pixel $p_i$ is a couple of horizontal and vertical coordinates $p_i = (x_i, y_i)$. The central and normalized shape moments $\mu_{a,b}$, $\eta_{a,b}$ are simply expressed for $(a, b) \in N^2$ by:

$$\bar{x}(P_{p_1}^\lambda(u)) = \frac{1}{n} \sum_{i=1}^{n} x_i, \quad (6)$$

$$\bar{y}(P_{p_1}^\lambda(u)) = \frac{1}{n} \sum_{i=1}^{n} y_i, \quad (7)$$

$$\mu_{a,b}(P_{p_1}^\lambda(u)) = \sum_{i=1}^{n} (x_i - \bar{x})^a (y_i - \bar{y})^b, \quad (8)$$

$$\eta_{a,b}(P_{p_1}^\lambda(u)) = \frac{\mu_{a,b}}{\mu_{0,0}^{(a+b)/2+1}}. \quad (9)$$

According to the example, four descriptors are used, which are the area, the eccentricity and the two first Hu moments. The three first descriptors are intended to discriminate the connected components based on their size, while the Hu moments and eccentricity complement the discriminant information which is independent of the scale or orientations. All descriptors are shift invariant. Their formulations are recalled in Table 2 below, and they can be computed efficiently by exploiting the nesting property.

TABLE 2

A selection of shape descriptors with their formulation using the central and normalized shape moments.

| | |
|---|---|
| Area | $\mu_{0,0}$ |
| Eccentricity | $\sqrt{1 - \frac{\lambda_1}{\lambda_0}}$ |
| $\lambda_i$ | $\frac{\mu_{2,0} + \mu_{0,2}}{2} + (2i - 1)\frac{\sqrt{4\mu_{1,1}^2 + (\mu_{2,0} - \mu_{0,2})^2}}{2}$ |
| $Hu_1$ | $\eta_{2,0} + \eta_{0,2}$ |
| $Hu_2$ | $(\eta_{2,0} - \eta_{0,2})^2 + 4\eta_{1,1}^2$ |

Then, these shapes may be clustered thanks to the k-means algorithm. Given one cluster, all the shapes associated to the cluster, and fed into a direct filtering of the tree-of-shapes. This produce an image with the selected shapes with the size of the original image. The same procedure may be repeated for each cluster providing a stack of images, each one representing a type of shape. Finally, the averages of the stacked images may be extracted in each window to build their shape distribution. In an exemplary case, a clustering of 128 clusters may be used (as described previously), resulting in a feature vector of 128 dimensions for each window. The process may be repeated for pre and post-windows.

The discriminative power of shape distribution may be understood with an analogy to the game TETRIS™. In TETRIS™, a player is given some shapes and the goal is to fill some space with these shapes such that no overlap takes place. One who has played the game has appreciated the very few possibilities which exist to fill the space. Shape distribution can be understood in the same way: given a set of binary shapes, how many ways may they be arranged in a window such that they fill the area and they do not overlap? There are few possibilities. The only flat knowledge of the components restricts the possible spatial arrangements making it a powerful but simple representation. In addition, TETRIS™ uses a set of shapes. By analogy, types of shapes according to the embodiments herein may be given by cluster centroids.

Considering convolutional neural networks fundamentally as nonlinear feature maps, they may be used for nonlinear feature extraction of each of the 50×50 image chips. In an exemplary arrangement, the structure of a winning network of an ImageNet large-scale visual recognition competition (ILSVRC) 2012 may be used. This pre-trained network may be fine-tuned using satellite images of different object classes obtained from different cities around the world. This fine-tuned network may be used to extract multidimensional output vectors for each of the 50×50 image chips. For efficiency, the Caffe framework may be used both for network fine-tuning and feature extraction.

Unsupervised change detection has attracted a lot of interest in the art, since it does not rely on the collection of training examples and it can be deployed at large scale. Given the high dimension of the used features, an exemplary arrangement may use a linear canonical correlation analysis (CC). For example, let x and y be the pre and post-feature vectors computed for a given window. Let X and Y be the random variables whose realizations are the pre and post-features extracted from a given pair of images. The canonical correlation analysis tries to re-project separately X and Y into $\tilde{X}=Xa$ and $\tilde{Y}=Yb$, such that these last variables have a maximum of correlation. We assume that X and Y and centered. In matrix terminology, the problem is posed in solving:

$$\tilde{a}, \tilde{b} = \arg\max_{a,b} \frac{a^T X^T Y b}{\sqrt{a^T X^T X a} \sqrt{b^T Y^T Y b}} \quad (10)$$

This problem is can be solved by a generalized eigenproblem, where the eigenvalue represents the correlations of the various projections. The eigenvectors corresponding to an eigenvalue above a threshold are retained and they are stacked into $\hat{a}$ and $\hat{b}$. Finally, the change indicator is computed as norm of projected space difference:

$$c(x,y) = \|x\hat{a} - y\hat{b}\| \quad (11)$$

The values further away from zero, are considered not fitting the global mapping of features and are thus associated to changes.

The canonical correlation analysis allows different dictionaries on the pre and post-images, because it is built to retrieve the best dictionary entries matches to compute the optimal projections.

In another exemplary arrangement, a Linear SVM (SVM-L) machine learning algorithm may be used given a plurality of training samples. According to the arrangement, a label may be associated with a window, and its features are the stack of the pre and post-features. L1-regularized and L2-loss implementation may be used to learn a decision function. The L1 regularization may be been selected to integrate a feature selection from large dimensions according to a particular arrangement. For collecting a training set, half of the windows being associated to a significant change may be randomly selected and an equivalent number of windows not being a relevant change may be sampled. These training examples can be easily selected from an available raster ground-truth. Given that the relevant changes represent a fraction f of the total number of windows, a relative fraction f/2 of positive and f/2 of negative examples may be selected, which leads to a training set of relative size of f.

A supervised approach relies on the availability of training examples which may be difficult to collect given the small fraction of relevant changes. To effectively sample the data space in an operational scenario, an exemplary arrangement may use an unsupervised CC change indicator to effectively collect training examples which may then be fed into a linear SVM algorithm as described above.

The value distribution of the CC change indicator follows a gamma distribution, where most of the values are concentrated around some strictly positive average. In a first sampling strategy (SS1), samples may be collected such that the gamma distribution is equalized to a uniform distribution. Thus, the high and close-to-zero values, which correspond to change and no change are more sampled than others.

A second sampling strategy (SS2) may consist of thresholding a CC change indicator to retain likely changes, and randomly sampling from within it. This second method allows sampling around the likely changes only.

To evaluate the change indicators, an exemplary arrangement may use the receiver operational characteristic (ROC) curve which are computed against the ground-truth collected in the form of geolocated points. According to the arrangement, the true positive rate (TPR) represents the amount of relevant changes detected over the total number of changes. A false positive rate (FPR) represents the quantity of false alarms with respect to the area of no change. Given that the area of change represents a fraction f of the total area, for a given couple of (TPR, FPR), the associated change indicator covers an area of TPR*f+FPR*(1−f), which is also the relative search space size. Therefore, the search space can be reduced from 1 to TPR*f+FPR*(1−f). In the following, the search space reduction is given as 1−(TPR*f+FPR*(1−f)). Finally, as in average the fraction of change is very small, f<<1, a straightforward approximation of the search space reduction is given by 1−FPR. In the following, FPR is used as a proxy to the amount of search space reduction. Finally, an equal error rate may be used as a summary of the performance of the ROC curve. The EER is given as the ROC curve point which satisfies FPR=(1−TPR).

A features discrimination power may be compared with the CC and SVM-L algorithms. In the case of the SVM-L algorithm, a portion of the positive samples with an equivalent number of negative examples may be retained and evaluation may be performed on the remaining examples. ROC curves may be averaged over pairs and the average and standard deviation of the EER may be reported for each combination of feature and machine learning in Table 3 below.

TABLE 3

The average and standard deviation of the Equal Error Rate are represented for the 5 sets of features and the vector flow approach.

|  | CC | SVM-L |
|---|---|---|
| SD | 0.339 ± 0.088 | 0.123 ± 0.068 |
| CNN | 0.385 ± 0.137 | 0.151 ± 0.068 |
| BSIFT | 0.462 ± 0.049 | 0.149 ± 0.071 |
| BLLC | 0.447 ± 0.057 | 0.156 ± 0.074 |
| GSD | 0.429 ± 0.072 | 0.205 ± 0.077 |
| Vector Flow | 0.473 ± 0.029 | — |

Figure 8:
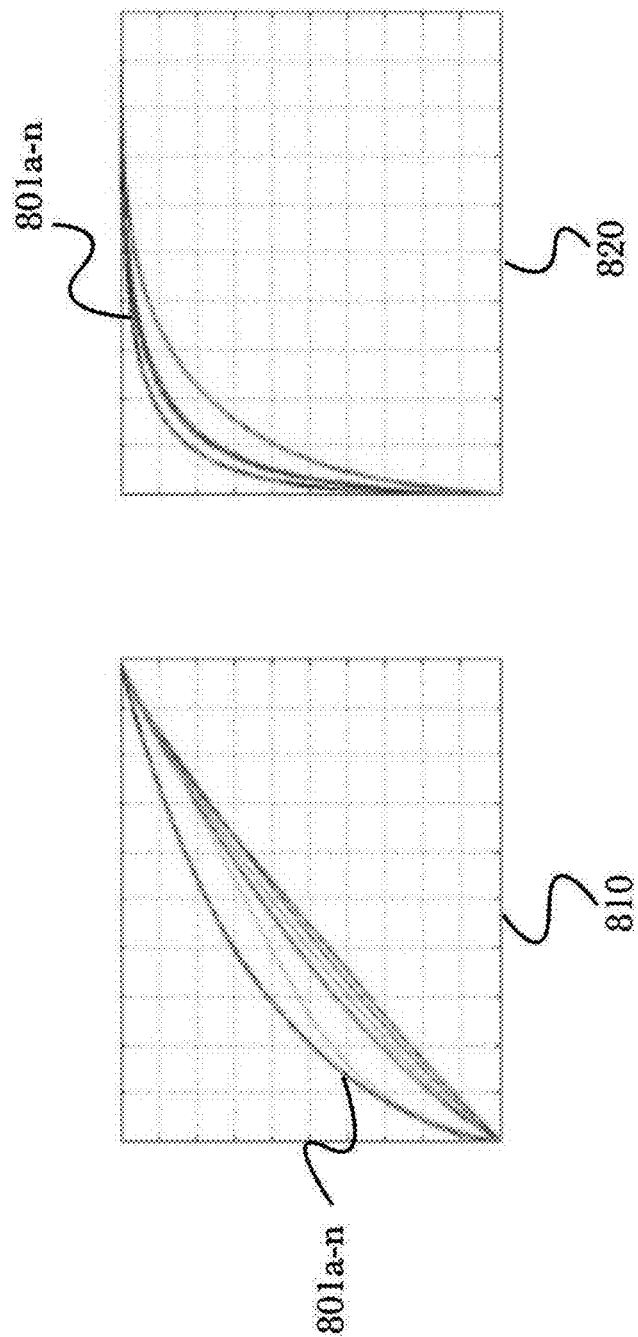
FIG. 8 illustrates the use of features discrimination on an exemplary selection of image features.

FIG. 8 illustrates the use of features discrimination on an exemplary selection of image features. As illustrated, average rate-of-change (ROC) curves for 5 sets of features 801a-n are shown 810 according to a vector flow ROC using an unsupervised method, as described above. Alternately, ROC curves for the sets of features are shown 820 when combined with an SVM-L algorithm.

It may be observed that features perform the best with both supervised and unsupervised machine learning algorithms. The SIFT and CNN-based features have similar performances with the supervised algorithm, while CNN-based features performs better than the other in the unsupervised situation. Finally, we observe that a gain of about 0.20 in the EER can be obtained by employing a supervised approach, which highlights the benefits of collecting training samples for narrowing down the search space. Given the EERs, a portion of the relevant changes may be captured in average with the SD features and SVM-L, while reducing the search space accordingly.

To assess the complexity of the method, time complexities may be provided as required for processing 1 million windows of 50×50 pixels. It may be assumed that the windows are collocated and overlapping such that use algorithms acceleration such as image integral-based filtering. The timings for computing the features from 1 million pairs of pre and post-windows and the unsupervised change indicator are reported in Table 4 below, with the use of a single Intel XEON™ CPU. In the case of vector flow and CNN, a graphics processing unit (GPU) has been used on top of the CPU to further accelerate the computation.

TABLE 4

Time for computing features and unsupervised change indicator are reported for 1 million pairs of windows.

| Features | Computation time (s) |
|---|---|
| Flow | 10 |
| GSD | 170 |
| BSIFT | 124 |
| BLLC | 550 |
| SD | 778 |
| CNN | 11406 |

Vector flow may be the fastest computation because it avoids the redundant window-based calculus. Then, BSIFT performs the fastest. Indeed, the burden of computation resides in the bag-of-features aggregation, which may be drastically reduced by an 8×8 SIFT grid. Additionally, the most accurate features SD and CNN are many times slower to compute than BSFIT.

Figure 9:
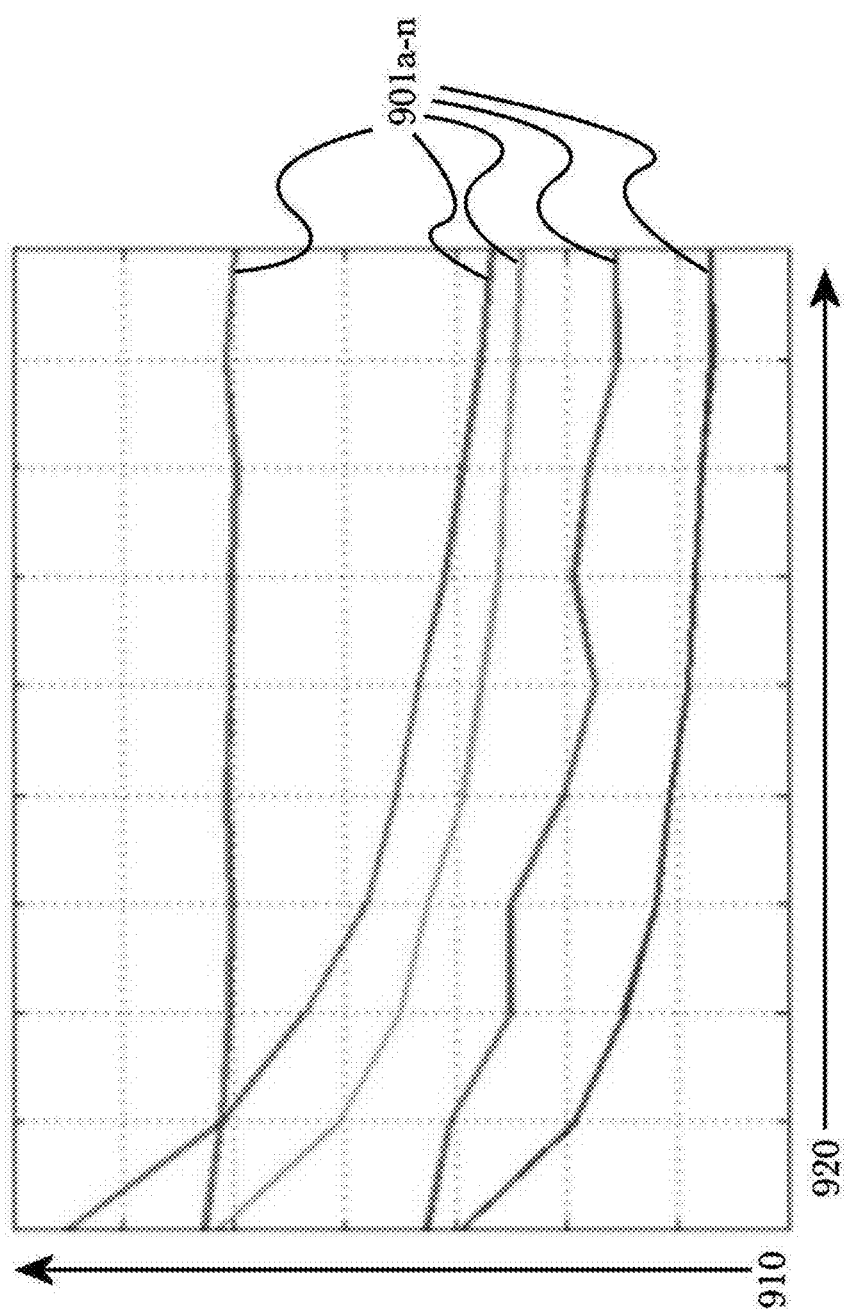
FIG. 9 illustrates EER reporting, with training set size given as percentages of positive samples with respect to the total number of positive instances in an AOI.

The effect of a training set size is a key parameter, and may impact the expected accuracies. The method gets its benefits in building models from as few as possible training examples, such that the produced heat map can be effectively used to perform the photo-interpretation. A key parameter in building an accurate model depends on the number of positive samples which are collected for an AOI. Thus, according to an exemplary embodiment the average EER may be reported as illustrated in FIG. 9, with training set size given as percentages of positive samples with respect to the total number of positive instances in the AOI. As illustrated, average EER are shown as a vertical axis 910 with respect to the training set size used 920 with an SVM-L algorithm for each of 5 sets of features 901a-n. Some improvements may be observed in the model accuracies with the number of positive training examples, except with the GSD features. According to the embodiment, the gain in EER is about 0.05 from using 50% over 5% of positive training samples. Moreover, this shows that a supervised approach with few training samples brings an average improvement of 0.15% of the EER in comparison to the proposed unsupervised technique.

The previous description highlighted the importance of the number of positive training samples to build accurate models. Two sampling strategies were described, and they exploit unsupervised change indicators to maximize the number of collected positive samples. To compare the two sampling strategies SS1 and SS2, an average percentage of positive training samples may be reported with respect to the full AOI in Table 5 below. The training examples are collected for a fixed budget of samples. We also report the percentage obtained with a random sampling of the AOIs. We observe that the second sampling strategy SS1 performs worse than the random sampling making it inadequate for such a task. Also, we observe that the first sampling strategy SS2 allows 718 to double the percentage of positive training samples over a random sampling by exploiting the unsupervised change indicator produced by the canonical correlation analysis. The ranking of the SS2 strategy depends directly on the performance of the CC algorithm with the proposed features. In summary, the sampling strategy allows us to gain a few percent in EER by increasing the percentage of positive training examples.

TABLE 5

Percentage of positive training examples obtained for the two sampling strategies.

|  | SS2 | SS1 | Rand |
|---|---|---|---|
| SD | 9.72 | 2.66 | 3.70 |
| CNN | 8.62 | 2.44 | 3.70 |
| BSIFT | 2.95 | 2.01 | 3.70 |
| BCNN | 3.58 | 2.31 | 3.70 |
| GSD | 5.34 | 2.78 | 3.70 |
| Vector Flow | 2.75 | 2.05 | 3.70 |

The time reduction on the photo-interpretation obtained by using an automatic change indicator is assessed in one exemplary embodiment. This case is composed of two images of size 7500×11250 pixels which are split into 33750 non overlapping tiles of 50×50 pixels. Two experts were asked to decide the pairs of image windows were containing relevant changes in the first place. Timings and ROC rates were recorded and averaged. Secondly, a change indicator may be derived by using the shape distribution and the SVM algorithm with 3% of positive samples. This change indicator may then be used to select the windows to be photo-interpreted by the two experts. According to the embodiment, the change indicator may be thresholded in order to obtain a TPR of 0.83 and FPR of 0.06, which correspond roughly to a reduction of search space of 94%. The metrics are reported in Table 6 below.

TABLE 6

Time and performances of photo interpretation in one case.

| Change Indicator | Time (s) | FPR | TPR |
|---|---|---|---|
| None | 41767 | 0.03 | 0.88 |
| SD + SVM-L | 4048 | 0.007 | 0.74 |

It may be observed that while the search space is reduced to 6% of the full AOI, the time to perform the change detection is reduced to 9.6% of the full time. This difference can be explained, by the fact that focusing on areas of changes relevant or not make the decision harder to take as opposed to take decisions anywhere in the image where there is obviously no change. However, it is still apparent that the gain in photo-interpretation is in the order of magnitude of the search space. Secondly, it may be noticed that the TPR drops from 0.83 to 0.74, because the photo interpret makes still mistake with a recall of 0.95. The recall of 0.88 obtained in the full interpretation case is worse relatively. However, the recall of the full interpretation is still higher than the one obtained with the change indicator, because very places are inspected. Also, it may be noticed that much more false-alarms are derived in the non-driven situation because mistakes proportionally increase with the number of windows. In the driven case, the false positive rate drops to 0.007% from the initial 6%, while being of 13% relatively. However, since this rate applies to 6% of the AOI, it absolutely drops to a very small level. Therefore, the change indicator helps the expert to be more focused on the change of interest and make less mistakes as they do not photo interpret the no change areas. In summary, this comparison shows the interest of using a change indicator derived in a supervised way to focus and make the photo interpretation more precise. As a remark, it has been shown in several studies that several photo interpretations are necessary for achieving a high recall. The proposed change indicator can be thus used as a proxy to allocate the number of photo-interpreters per sub areas.

The skilled person will be aware of a range of possible modifications of the various embodiments described above. Accordingly, the present invention is defined by the claims and their equivalents.

What is claimed is:

1. A system for global-scale damage detection using satellite imagery, comprising:
  a damage detection server comprising at least a plurality of programming instructions stored in a memory and operating on a processor of a network-connected computing device, the plurality of programming instructions, when operating on the processor, causing the processor to:
    receive at least a plurality of image information from an image database;
    analyze at least a portion of the image information by decomposing at least the portion of the image information into a plurality of shapes;
    extracting a plurality of scale-invariant transform descriptors based at least in part on at least a portion of the plurality of image information;
    performing k-means clustering on the plurality of shapes associated to at least a portion of the plurality of image information;
    producing a plurality of locally-constrained linear codes based at least in part on at least a portion of the plurality of image information;
    produce at least a plurality of object vector representations based at least in part on at least a portion of the analysis results; and
  a curation interface comprising at least another plurality of programming instructions stored in another memory and operating on another processor of another computing device, the another plurality of programming instructions when executed by the processor cause the processor to:
    receive at least a portion of a plurality of image information,
    receive interaction from a user device,
    modify at least a portion of the plurality of image information based at least in part on at least a portion of the interaction.

2. The system of claim 1, wherein the another plurality of programming instructions when executed by the processor further causes the processor to:
  receive at least a plurality of object vector representations, and
  modify at least a portion of the object vector representations based at least in part on at least a portion of the interaction.

3. A method for global-scale damage detection using satellite imagery, comprising the steps of:
  querying, using a damage detection server comprising at least a plurality of programming instructions stored in a memory and operating on a processor of a network-connected computing device, the plurality of programming instructions, when operating on the processor, causing the processor to
    receive at least a plurality of image information,
    analyze at least a portion of the image information by decomposing at least the portion of the image information into shapes; and,
    produce at least a plurality of damage detection identifiers based at least in part on at least a portion of the analysis results,
  an image database for a plurality of image information;
  extracting a plurality of scale-invariant transform descriptors based at least in part on at least a portion of the plurality of image information;
  performing k-means clustering on shapes associated to at least a portion of the plurality of image information;
  producing a plurality of locally-constrained linear codes based at least in part on at least a portion of the plurality of image information; and
  performing spatial pooling based at least in part on at least a portion of the plurality of locally-constrained linear codes to produce a plurality of object vector representations, the object vector representations corresponding to at least a plurality of objects identified within at least a portion of the plurality of image information.

\* \* \* \* \*